United States Patent [19]

Cannon

[11] 4,058,705

[45] Nov. 15, 1977

[54] MAGNETIC CARD READER

[76] Inventor: John W. Cannon, 7129 Gerald Ave., Van Nuys, Calif. 91406

[21] Appl. No.: 655,388

[22] Filed: Feb. 5, 1976

[51] Int. Cl.² .................. G06K 7/08; G06G 7/14; G11B 5/12

[52] U.S. Cl. .................. 235/449; 328/147; 360/113; 235/485; 235/493

[58] Field of Search .................. 360/112, 113, 67; 235/61.11 D, 61.11 E; 328/116, 146, 147; 307/235 N, 235 P

[56] References Cited

U.S. PATENT DOCUMENTS

| 3,668,532 | 6/1972 | Potash | 328/147 |
|---|---|---|---|
| 3,731,007 | 5/1973 | Masuda | 360/113 |
| 3,814,863 | 6/1974 | O'Day | 360/113 |
| 3,851,259 | 11/1974 | Porawski | 307/235 N |
| 3,912,943 | 10/1975 | Wilson | 328/146 |
| 3,969,769 | 7/1976 | Gorter | 360/113 |

Primary Examiner—Robert M. Kilgore
Attorney, Agent, or Firm—Harris, Kern, Wallen & Tinsley

[57] ABSTRACT

A reader for a magnetically coded card with a magnetodiode as the magnetic field sensor. A circuit for compensating for changes in magnetodiode resistance due to ambient temperature change. First and second amplifiers connected in a self balancing nulling system and having the magnetodiode signal as an input, and providing a null output signal for no magnetic field at the diode, with third and fourth amplifiers connected as comparitors and providing high and low output signals for magnetic fields of opposite polarity.

4 Claims, 8 Drawing Figures 4,058,705

MAGNETIC CARD READER

BACKGROUND OF THE INVENTION

This invention relates to readers for magnetically coded cards such as are used in access control systems. A typical card is made of plastic with magnetic material embedded therein. In one form, individual magnets are positioned in the card. In the presently preferred form, a piece of magnetic material is laminated in the card and then spots are selectively magnetized along the magnetic material to provide a specific code. A typical card reader has a guide for slidingly receiving the card. The magnetic fields produced by the card may be used to mechanically move locking pins in the reader providing direct unlocking. Alternatively in more complex systems, the magnetic fields or the absence of magnetic fields at specific locations are sensed to provide a set of electrical signals as an output corresponding to the code of the card inserted in the reader.

In one type of card reader, devices are provided for sensing the presence or absence and polarity of the magnetic field produced by the card at every possible location of a magnetic spot on the card, with the sensing being done simultaneously so that a quantity of N bits require N sensors and at least N+1 data lines for transmission of the sensed information. Typical cards may utilize a 10 bit code with eleven output lines in parallel being required. A sensor of this type using magnetic reed switches as the sensors as shown in U.S. Pat. No. 3,581,030. Another reader, utilizing sensing coils, is shown In U.S. Pat. Nos. 3,717,749 and 3,780,268. Hall effect transducers have also been used for magnetic sensing. The readers using sense coils and Hall effect transducers generally require electronic amplification for the sense signals. The readers identified above are parallel type devices, requiring N+1 wires for data transmission from N sensors.

Serial type readers have been utilized with a single magnetic sensor with the card moving relative to the sensor. However, reliable operation demands a constant relative motion between the sensor and the card because of the sensor's dependence on the rate of change of magnetic flux ($d\phi/dt$). Hall effect devices have been considered for serial readers because they respond to magnetic field strength rather than rate of change of field but are not satisfactory because of their relatively large size, high cost, general difficulty in usage, and requirement of four wires for operation.

The magnetodiode is a semiconductor device, the resistance of which changes as a function of magnetic field strength applied to the device. The magnetodiode has been proposed as a sensor for magnetically coded cards; however, because of its relatively poor temperature characteristic, the diode has not been satisfactory. It is an object of the present invention to provide a new and improved reader for magnetically coded cards, incorporating a magnetodiode as the sensor. A particular object is to provide such a reader with output circuitry eliminating the adverse effects normally resulting from changes in ambient temperature.

It is an additional object of the invention to provide such a reader which can provide a serial output requiring only two wires, i.e., a signal wire and a ground return. A further object is to provide such a reader which is not dependent on the velocity of relative motion of the card and sensor and which does not require a constant velocity for operation. An additional object is to provide such a reader with an output which is self-clocking.

SUMMARY OF THE INVENTION

The card reader includes a housing with a guide for the magnetically coded card and a magnetodiode as the sensor. The card is moved relative to the sensor, typically by sliding the card into the reader. The magnetodiode, either a single or a pair, is connected across a voltage source in the conventional manner and provides a voltage signal as an output, as the magnetic field at the diode changes. First and second amplifiers are connected in a self-balancing nulling system with the diode voltage signal connected as one input to the first amplifier and with the output of the second amplifier connected as the second input to the first amplifier through a time delay circuit. The output of the first amplifier is connected as one input to the second amplifier and to the third and fourth amplifiers. Reference voltages are provided as inputs to the second, third and fourth amplifiers, with the outputs of the third and fourth amplifiers combined to provide the reader output. The system is tristate, providing a first voltage for a no-magnetic-field condition, a higher voltage for a magnetic field of one polarity and a lower voltage for a magnetic field of the opposite polarity. The output is a self-clocking pulse train with a pulse for each magnetic spot on the card.

DESCRIPTION OF THE PREFERRED EMBODIMENT

Figure 1:
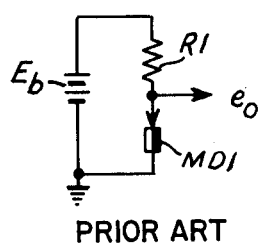
FIG. 1 is a diagram of a conventional circuit for utilizing a magnetodiode.

In FIG. 1, a magnetodiode MD1 is connected in series with a resistor R1 across a voltage source $E_b$, with the output of the circuit $e_o$ appearing at the junction of the resistor and diode. Typically, the resistance of R1 is selected to be equal to that of the diode MD1 for zero magnetic field. The the output voltage $e_o$ is one-half the supply voltage $E_b$. If a magnetic field of one polarity is applied to the diode, its resistance increases and the output voltage increases. Similarly, if a magnetic field of the opposite polarity is applied to the diode, its resistance decreases and the output voltage decreases. The resistance of the magnetodiode and hence, the output voltage of the circuit is a function of the magnetic field strength rather than the rate of change of magnetic field. Hence, the output of the circuit is not dependent upon the rate at which a magnetic field or series of magnetic fields is moved past the magnetodiode.

Figure 2:
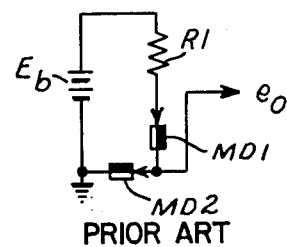
FIG. 2 is a diagram of a conventional circuit for utilizing two magnetodiodes.

However, the circuit of FIG. 1 is not suitable for use in a magnetic card reader because the output voltage changes resulting from normal ambient temperature excursions are greater than the output voltage changes resulting from magnetic fields of the strengths utilized in magnetically coded cards. One attempt to improve the operation is shown in FIG. 2, where two magnetodiodes MD1 and MD2 are connected in a push-pull type circuit so as to cancel out the thermal drift while increasing the output as a result of the opposite magnetic polarization of the two diodes. Two magnetodiodes so connected can be obtained in a single package. They are connected in series across the voltage source, with or without the resistor R1. The operation is the same as with the circuit of FIG. 1. However, both the size and cost of the circuit is increased and although there is some improvement in thermal characteristics, the product is still not satisfactory.

Figure 7:
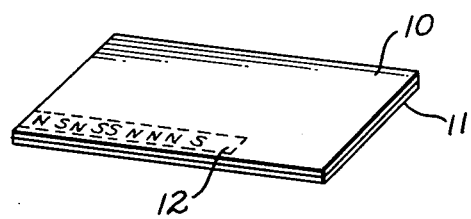
FIG. 7 illustrates a typical magnetically coded card.

A typical magnetically coded card is shown in FIG. 7 and comprises upper and lower plastic sheets 10, 11 with a strip 12 of magnetic material laminated therebetween. A series of magnetized spots is provided in the magnetic material by conventional means and the specific card illustrated is coded N S N S S N N N S. If a North pole is considered a one and a South pole is considered zero, the binary code for this particular card is 101001110.

Figure 8:
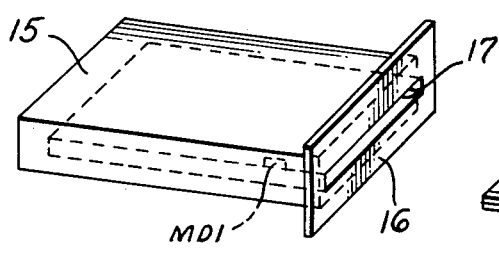
FIG. 8 shows a reader housing for use with the card of FIG. 7 and circuit of FIG. 5.

A typical reader is shown in FIG. 8, including a housing 15 carried on a face plate 16 and having a slot 17 for receiving a card. A magnetodiode MD1 is mounted in the housing and positioned so that the strip 12 of the card passes the diode as the card is inserted into the reader.

Figure 3:
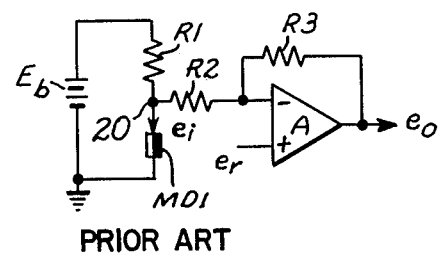
FIG. 3 is a diagram of a conventional circuit with magnetodiode and output amplifier.
Figure 4:
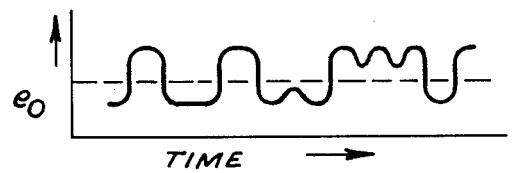
FIG. 4 illustrates the output of the circuit of FIG. 3 when utilized in a card reader with a card coded as illustrated in FIG. 7.
Figure 6:
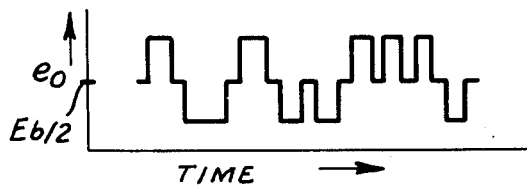
FIG. 6 illustrates the output of the circuit of FIG. 5 for a card coded as in FIG. 7.

In the circuit of FIG. 3, the junction of resistor R1 and diode MD1 is connected as one input to a high gain operational amplifier A through resistor R2, with resistor R3 connected between the amplifier output and input. If the magnitude of resistor R3 is very much greater than that of resistor R2 and the reference input $e_r$ is exactly equal to the voltage $e_i$ at the junction 20 at zero magnetic flux on the diode MD1, then exposure of the diode to a reversing magnetic field such as is produced by inserting the card of FIG. 7 into the reader of FIG. 8, will produce an output $e_o$ as shown in FIG. 4. This circuit is not self-clocking and requires some form of external clock to distinguish between adjacent North poles and adjacent South poles of the coded card.

Also, if the temperature of the diode MD1 is varied to the point where its resistance is so low that the resistance increase due to a North magnetic flux change does not produce a voltage increase at junction 20 exceeding the reference voltage $e_r$, no change in the output voltage $e_o$ will be produced since $e_i$ remains always below $e_r$.

Figure 5:
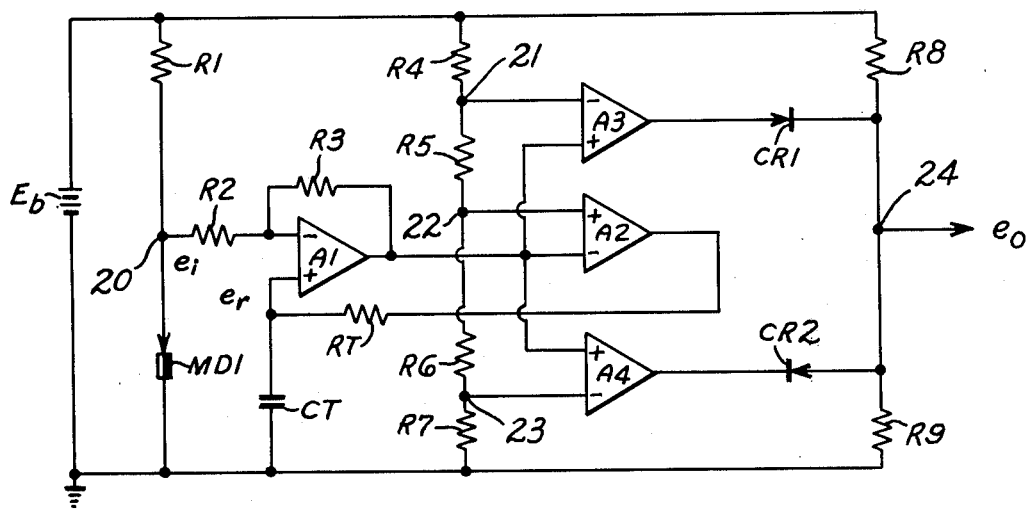
FIG. 5 is a circuit for a magnetodiode and incorporating the presently preferred embodiment of the invention.

The present invention provides a solution for this problem, as illustrated in FIG. 5. In the circuit of FIG. 5, elements corresponding to those of the circuit of FIG. 3 are identified by the same symbols, with amplifier A1 of FIG. 5 corresponding to amplifier A of FIG. 3. Resistors R4, R5, R6 and R7 are connected as a voltage divider across the voltage source $E_b$, providing reference voltages at junction 21 for one input to amplifier A3, at junction 22 for one input to amplifier A2, and at junction 23 to provide one input for amplifier A4. The output of amplifier A1 is connected as the other input to each of amplifiers A2, A3 and A4. The output amplifier A2 is connected as the other input to amplifier A1 through a time delay circuit consisting of resistor RT and capacitor CT. Resistors R8 and R9 are connected together at junction 24 across the voltage source $E_b$, with the output $e_o$ of the circuit appearing at junction 24. The output of amplifier A3 is connected to the junction 24 through diode CR1 and the output of amplifier A4 is connected to the junction 24 through diode CR2.

The amplifiers A1 and A2 function as a self balancing nulling system, causing the input $e_r$ of amplifier A1 to assume a new value equal to the voltage signal $e_i$ at junction 20 for a zero magnetic field, that is, causing the reference voltage $e_r$ to continuously adjust itself to the value required for nulling the circuit as the temperature of the magnetodiode MD1 varies.

Typically, the sum of the resistors R4, R5 is made equal to the sum of the resistors R6, R7, thereby causing the input of amplifier A2 from junction 22 to be exactly one-half the supply voltage $E_b$, a bias of 50% of power supply. At the time the voltage supply is connected, with zero magnetic field at the diode MD1, the input $e_i$ to amplifier A1 will be higher than the input $e_r$ and the output of amplifier A1 will go to maximum negative. This causes the output amplifier A2 to go to maximum positive and current flows through resistor RT into capacitor CT and slowly raises the input $e_r$ until the output of amplifier A1 rises to the value $E_b/2$. At this time, the output of amplifier A2 drops to approximately $e_r$ and the system is in balance.

As the voltage at junction 20 changes in either direction due to temperature change at the magnetodiode, the reference voltage $e_r$ precisely tracks the other input voltage $e_i$ but only after a delay produced by the time delay circuit RT, CT. The time constant for this circuit is made relatively long, typically several seconds, so as to permit thermal tracking by the circuit but still allow the magnetodiode to react to the North and South magnetic flux changes of short duration produced by insertion of the card, without immediately adjusting the reference voltage $e_r$ so as to bias out the signals due to the card flux fields.

The amplifiers A3, A4 typically are operational amplifiers operated open loop to function as comparitors. The reference voltage at junction 21 biases the minus input of amplifier A3 at a value determined by the resistors R4-R7 which typically may be 60% of the supply voltage $E_b$. The reference voltage at junction 23 providing the minus input for the amplifier A4 is similarly controlled and typically may be 40% of $E_b$. This permits the output of amplifier A1 an excursion of 20% of the supply voltage $E_b$ without affecting the output $e_o$, since the output of amplifier A3 is full negative and the output of amplifier A4 is full positive and the diodes CR1 and CR2 are cut off, allowing the output $e_o$ to remain at its bias point of one-half $E_b$. This provides a dead band or window which accommodates the amplified noise and the short term uncompensated drift of the diode MD1 and sets the clipping level or threshold for legitimate signals resulting from a coded card, as distinguished from the noise.

When the output of amplifier A1 rises above 60% of $E_b$ due to presence of a magnetic field of one polarity at the magnetodiode, the amplifier A3 pulls the output voltage $e_o$ fully positive through diode CR1. Similarly, a drop in the output of amplifier A1 resulting from a magnetic field of the opposite polarity at the magnetodiode pulls the output voltage $e_o$ fully negative via amplifier A4 and diode CR2. As discussed previously, the output of the circuit of FIG. 3 provides essentially no time at precise balance (indicated by the dash line of FIG. 4). In contrast, the output $e_o$ of the circuit of FIG. 5 spends all the no signal time at $E_b/2$ and spends significant time there during the reading of a magnetic card. The output signal from the circuit is a tri-state pulse train which is inherently self-clocking, providing dwell-time at the null value $E_b/2$ between each magnetic spot, i.e., a separate pulse is produced for each magnetic spot even though North spots are side by side and South spots are side by side. This obviates any requirement for a clock or strobe recording which is required for non-self-clocking asynchronous signals.

The bias figures of 40% and 60% of $E_b$ are provided as examples only. Various values may be chosen as desired, and the differential for North and South magnetic fields may be made different to compensate for differences in sensitivity of the magnetodiode. Also, while a single magnetodiode has been illustrated in the circuit of FIG. 5, corresponding to the circuit of FIG. 1, a pair of magnetodiodes may be used as shown in FIG. 2. The circuit of FIG. 5 provides a serial output on two wires for a multi-bit code and there is no limit on the number of bits which the coded card may carry. If a parallel output is desired for some reason, the serial output may be stored in a shift register which provides a parallel output in the conventional manner. The reader incorporating the circuit of FIG. 5 is not speed sensitive, that is, the output is not dependent upon the relative velocity of the magnetodiode and the coded card. The card may be inserted at a variable rate which may include a period of time at zero velocity. Of course, a reversal in direction of card motion during insertion can produce an incorrect output with additional bits in the output signal. However, this is not a problem since access would be denied for this incorrectly inserted card.

I claim:

1. In a reader for a coded card having a plurality of magnetized spots of predetermined polarity, the combination of:
   a housing including guide means for receiving a card;
   magnetodiode means carried in said housing for motion relative to the magnetized spots of the card;
   a voltage source connected across said magnetodiode means whereby a change in magnetic field at said magnetodiode means produces a voltage signal;
   a first amplifier having said voltage signal connected as one input thereof;
   a second amplifier having the first amplifier output connected as one input thereof;
   a time delay circuit connected between the second amplifier output and the second input of said first amplifier providing a variable reference voltage input to said first amplifier forming a self balancing nulling circuit so that the voltage at the second input of said first amplifier tracks the voltage at the first input of said first amplifier with a delay provided by said time delay circuit;
   third and fourth amplifiers, each having the first amplifier output connected as one input thereof;
   a voltage divider circuit connected across said voltage source and providing separate reference voltages as second inputs to each of said second, third and fourth amplifiers, with said second amplifier intermediate third and fourth amplifiers;
   first and second resistors connected in series across said voltage source; and
   first and second diodes connecting the outputs of said third and fourth amplifiers respectively to the junction of said first and second resistors, with one diode connected in opposite polarity to the other, with said junction providing a three level voltage pulse stream corresponding to the code of the card with a voltage pulse for each spot and with the voltage level returning to an intermediate level after each pulse.

2. A reader as defined in claim 1 wherein said magnetodiode means includes a magnetodiode connected in series with a resistor.

3. A reader as defined in claim 1 wherein said magnetiodiode means includes two magnetodiodes connected in series.

4. A reader as defined in claim 1 wherein said time delay circuit includes a third resistor connected between said second amplifier output and said first amplifier second input, and a capacitor connected between first amplifier second input and one terminal of said voltage source.

* * * * *